1,430,614

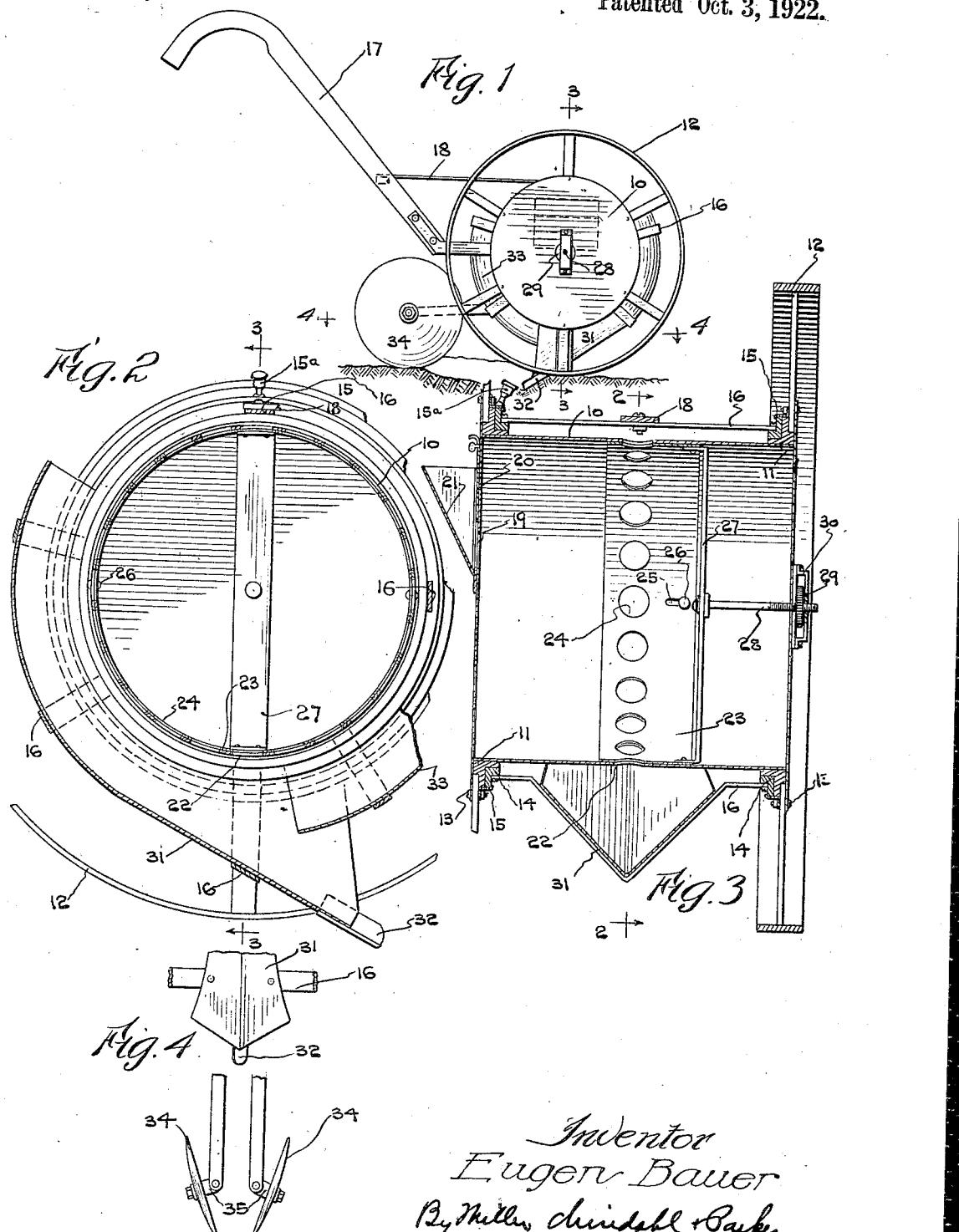
E. BAUER.
PLANTER.
APPLICATION FILED JULY 25, 1921.
1,430,614.
Patented Oct. 3, 1922.
Inventor
Eugen Bauer Patented Oct. 3, 1922.

UNITED STATES PATENT OFFICE.

EUGEN BAUER, OF MAINE, ILLINOIS.

PLANTER.

Application filed July 25, 1921. Serial No. 487,299.

*To all whom it may concern:*

Be it known that I, EUGEN BAUER, a citizen of the United States, residing in the town of Maine, in the county of Cook and State of Illinois, have invented certain new and useful Improvements in Planters, of which the following is a specification.

This invention relates to planters especially designed for planting onion sets.

The principal object of the invention is to provide an onion set planter which can be operated by hand to at all times deposit the sets one at a time in the soil at the desired depth and approximately the same distance apart.

Another object is to provide a simple and inexpensive device of this character embodying a truly balanced construction which renders it easy to operate.

Other objects will be made to appear in the following detailed description.

Referring to the accompanying drawing, Figure 1 is a right side elevation of a planter constructed in accordance with the invention. Fig. 2 is a fragmentary longitudinal section taken on line 2—2 of Fig. 3. Fig. 3 is a transverse section taken on lines 3—3 of Figs. 1 and 2, and Fig. 4 is a fragmentary sectional detail taken on line 4—4 of Fig. 1. In all of the views the same reference numerals designate the same parts and the sectional views are taken looking in the directions indicated by the arrows.

The planter comprises a seed receptacle in the form of a sheet iron hopper casing 10 which is preferably cylindrical in form and disposed horizontally between the hubs 11 of a pair of wheels 12. The casing is secured to the hubs 11 by end flanges through which bolts 13 pass and engage in the spokes of the wheels. A frame made up of rings 14 bears in annular grooves formed in the inner faces of the hubs 11. Resting on the periphery of the rings 14 and secured to the spokes of the drive wheels 12 by means of the bolts 13 are sheaths 15 which are preferably provided with lubricating means as for example, grease cups 15ᵃ so that lubricant may be supplied to the bearing surfaces, the sheaths serving to retain the lubricant and to prevent contamination thereof by the dirt stirred up by the planter and the operator walking in back of the planter. The frame is braced by cross pieces 16 which span the hopper between the rings 14. The handle shafts 17, by means of which the implement is pushed along in the operation of planting the sets, are fastened to the frame, a longitudinal brace 18 being provided to maintain the proper elevation of the ends of the handle shafts as shown in Fig. 1. To those skilled in the art to which this invention relates it is readily apparent that because the rows are planted about 14 inches apart the implement cannot be drawn by a horse.

The hopper 10 is in practice loaded with about a half bushel of onion sets. The sets are poured in through the inlet opening 19 which has a gate 20 and a funnel 21 mounted on the side of the casing to facilitate loading the hopper. A series of feed openings 22 are provided in the wall of the casing midway of the ends thereof. These openings discharge the sets and may be varied in size to accommodate various growths, by means of a band 23 which has openings 24 arranged to register with the openings 22. The band is prevented from relative rotary movement by longitudinal slots 25 in which rivets 26 passing through the wall of the hopper casing are made to engage. A spider 27 is fastened to one edge of the band 23 and has a central stem 28 which projects through a side wall of the casing to receive a nut 29 operating in a cage 30. The band is arranged to be adjusted laterally by turning the nut 29 thereby causing displacement of the openings 24 with respect to the feed openings 22.

A feed chute 31 is suspended beneath the hopper 10 and supported by the cross pieces 16. This chute which is comparatively long has a substantially trough-shaped portion extending towards its trailing edge in which the sets as they are dropped from the hopper through the feed openings 22 arrange themselves in single file so that it is ensured that no more than one bulb at a time will be deposited in the furrow formed by the drill tooth 32. This tooth is preferably provided by a separate piece riveted at the trailing edge of the chute. The chute extends beneath the hopper about halfway up the forward end thereof so that all of the sets will be caught as they are dropped. An auxiliary chute 33 similar to the chute 31 is provided at the back of the hopper and discharges into the chute 31 as shown in Fig. 2. In this way none of the sets which find their way out of the hopper at the back or at the front will be lost.

A pair of disks 34 which are carried on adjustable arms 35 in back of the drill tooth 32 serve to throw back the soil into the furrow formed by the drill tooth in order to cover the sets deposited in the bottom of the furrow from the chute 31. The arms 35 may be carried on the ends of bars fastened on the nether side of the chute 33 or to one of the cross pieces 16 whichever is most convenient.

The operation of the device is readily apparent from the foregoing description so that extensive detailed discussion is unnecessary. The planter is designed to hold in its hopper about one-half bushel at a time. It has been found most practicable to refill the hopper upon reaching the end of each row in order that the device will operate most effectively. Due to the construction and arrangement of the parts as above described there is little likelihood of sets being dropped into the furrow where the soil broken by the drill tooth has already fallen back into the furrow. The sets are fed in a single file down the chute 31 and are dropped one by one into the furrow directly as it is formed by the drill tooth 32 so that soil falling down after the furrow is formed will cover the sets only after they have been properly deposited therein. The remaining portion of the soil thrown up by the drill tooth is thrown back into the furrow by the disks 34.

It will be noted that the principal weight to be handled in operating the device is supported by the wheels 12 which roll over the ground comparatively easily. The drill tooth 32 lying as it does in a direct line with the handle shafts requires little effort to be moved through the soil to open the furrows. Rolling friction is also secured by providing the disks 34 to close the furrows. The drill tooth and the closing disks are quite effectively kept in proper relation to the soil by the weight of the loaded hopper which holds down the frame which carries these parts. In this way the tendency for upward thrust particularly of the drill tooth 32 in operation is counteracted.

Although from the foregoing description it might be inferred that the device is capable only of use for planting onion sets, it will be understood that by proper variation of the size of the feed openings the device can be arranged to operate quite as effectively in planting other seeds. In the following claims all legitimate modifications and adaptations of the invention as might occur to those skilled in the art to which this invention relates are intended to be covered.

I claim as my invention:

1. The combination in a device of the character described of a seed feeder, a chute extending along the under side of said feeder to receive seeds dropped therefrom, said chute having a V-shaped trough wherein the seeds are arranged in single file, a rearwardly and downwardly inclined furrow driller at the discharge end of said chute to open a furrow to receive the seed dropped singly from the trough in the chute, and means for closing the furrow formed by said driller.

2. In a planter, a trailing seed-feeding chute V-shaped in cross section, to arrange seed in single file, said chute being provided at its lower end with a rearwardly directed furrow opener along and upon which the seed travel rearwardly into said furrow and a supplemental chute arranged oppositely to said chute and adapted to deliver seed thereto.

3. In a planter, the combination of a pair of supporting wheels, a rotary feeding hopper fixed to and extending between the same, and a frame provided with handles and having a pair of rings forming bearings extending around opposite ends of the hopper and between the wheels, and in which bearings the hopper turns.

4. In a planter, the combination of a pair of supporting wheels, a rotary feeding hopper fixed to and extending between the same, and a frame provided with handles and having a pair of rings forming bearings extending around opposite ends of the hopper and between the wheels, and in which bearings the hopper turns, and sheaths carried by the wheels and extending around outside of said rings, to exclude dirt from the bearings.

In testimony whereof, I have hereunto set my hand.

EUGEN BAUER.